US009641281B2

(12) United States Patent
Bodenschatz

(10) Patent No.: US 9,641,281 B2
(45) Date of Patent: May 2, 2017

(54) METHODS AND APPARATUSES FOR ALLOCATING ELECTROMAGNETIC-SPECTRUM JAMMING ASSETS

(71) Applicant: Raytheon Company, Waltham, MA (US)

(72) Inventor: John C. Bodenschatz, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 1042 days.

(21) Appl. No.: 13/859,023

(22) Filed: Apr. 9, 2013

(65) Prior Publication Data

US 2016/0105254 A1 Apr. 14, 2016

(51) Int. Cl.
*G01S 7/36* (2006.01)
*H04K 3/00* (2006.01)

(52) U.S. Cl.
CPC ................. *H04K 3/43* (2013.01); *H04K 3/92* (2013.01); *H04K 3/45* (2013.01); *H04K 2203/24* (2013.01); *H04K 2203/34* (2013.01)

(58) Field of Classification Search
CPC .... G01S 7/38; G01S 7/04; G01S 7/36; H04K 3/45; H04K 3/43; H04K 3/92
USPC ........................................ 342/13–20; 455/1
See application file for complete search history.

(56) References Cited

U.S. PATENT DOCUMENTS 4,334,322 A 6/1982 Clark, III
6,411,891 B1 * 6/2002 Jones .................... G06Q 10/08 342/357.395
6,697,008 B1 2/2004 Sternowski
7,194,353 B1 * 3/2007 Baldwin ............... G01C 21/00 701/301
8,203,478 B1 * 6/2012 Huneycutt .............. H04K 3/28 342/14
8,258,998 B2 * 9/2012 Factor ...................... G01S 7/36 342/12

(Continued)

FOREIGN PATENT DOCUMENTS

WO WO-2014/209465 A2 12/2014
WO WO-2014209465 A3 12/2014

OTHER PUBLICATIONS

"International Application Serial No. PCT/US2014/033348, International Search Report mailed Feb. 5, 2015", 4 pgs.

(Continued)

*Primary Examiner* — Marcus Windrich
(74) *Attorney, Agent, or Firm* — Schwegman Lundberg & Woessner, P.A.

(57) ABSTRACT

Embodiments of a method and apparatus for assigning electromagnetic-spectrum (ES) jamming assets are generally described herein. In some embodiments, the method includes dividing an electronic warfare (EW) support area into a grid. The method may further include determining a vulnerability area (VA) of the entity based on planned route information of the entity within the EW support area. The VA may include portions of the grid. The method may further include assigning a first jamming asset to the VA based on a coverage capability of the first jamming asset. The coverage capability may include a number of contiguous portions of the grid.

26 Claims, 8 Drawing Sheets

(56) References Cited

U.S. PATENT DOCUMENTS

| | | | | |
|---|---|---|---|---|
| 8,692,703 | B1 * | 4/2014 | Dove | G08G 5/0034 342/13 |
| 2007/0069949 | A1 * | 3/2007 | Ferreol | G01S 3/46 342/417 |
| 2008/0169958 | A1 * | 7/2008 | Cohen | G01S 19/015 342/14 |
| 2008/0297395 | A1 | 12/2008 | Dark et al. | |
| 2008/0297396 | A1 * | 12/2008 | Dark | G01S 7/021 342/14 |
| 2009/0224956 | A1 * | 9/2009 | Dark | G01S 7/021 342/13 |
| 2011/0183602 | A1 | 7/2011 | Tietz | |
| 2012/0177219 | A1 * | 7/2012 | Mullen | F41G 3/147 381/92 |
| 2012/0309288 | A1 * | 12/2012 | Lu | H04K 3/45 455/1 |
| 2013/0027251 | A1 * | 1/2013 | Lu | G01S 5/04 342/451 |
| 2014/0159934 | A1 * | 6/2014 | Rudnisky | H04K 3/00 342/14 |

OTHER PUBLICATIONS

Vilela, Joao P., et al., "Position-Based Jamming for Enhanced Wireless Security", IEEE *Transactions on Information Forensics and Security, 6*(*3*), (Sep. 2011), 616-627.

"Application Serial No. PCT/U52014/033348, International Preliminary Report on Patentability mailed Oct. 22, 2015", 6 pgs.

"International Application Serial No. PCT/US2014/033348, Written Opinion mailed Feb. 5, 2015", 5 pgs.

* cited by examiner

200

METHODS AND APPARATUSES FOR ALLOCATING ELECTROMAGNETIC-SPECTRUM JAMMING ASSETS

TECHNICAL FIELD

Some embodiments relate to electronic warfare. Some embodiments relate to assigning jamming assets for protection of entities in a battle environment.

BACKGROUND

In a battlefield environment, ground forces may take evasive action to suppress electromagnetic-spectrum (ES) threats from hostile forces. For example, ground forces may destroy visible improvised explosive devices (IED) that are deployable remotely using ES-transmittable instructions. However, ground forces may be incapable of preventing ES communications from enemy command and control centers operating outside a range of the ground forces. Accordingly, ES threats may remain along at least a portion of the planned maneuver route of ground forces.

Thus, there is a general need to suppress hostile ES communication along an entire actual or predicted route of ground forces. There is also a general need to coordinate ES jamming operations among jamming assets to provide increased or improved battlefield coverage to multiple ground forces.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Currently, ground forces in hostile environments may be imperiled by many threats, including threats that utilize the electromagnetic spectrum (ES). Some ground forces, referred to hereinafter as protected entities (PEs), may be capable of self-protection from immediate or visible ES threats such as improvised explosive devices (IEDs) that operate in an ES environment.

Some hostile command and control (C2) threats may involve ES communications that takes place outside of a PE's self-protection range. Accordingly, in at least these situations, self-defense electronic attack (EA) may not be sufficient to suppress communications of the C2 system. Other systems may be necessary, therefore, to suppress the hostile force's C2 ES environment along an entire route of a PE.

In example embodiments, electronic warfare battle management (EWBM) may provide PEs with allocation of assets to suppress hostile C2 operations in an ES environment. In some embodiments, EWBM may manage third party effectors, for example, ES jamming assets, to provide a comprehensive grid of protection against ES threats that utilize a C2 network. In some embodiments, EWBM may provide a grid of protection to PEs on a battlefield based upon known ES threats and needed protection areas for unknown ES threats. In example embodiments, EWBM may provide this grid of protection by assigning protection assets to cover areas of the battlefield in a configuration that more effectively takes advantage of ES jamming assets.

Figure 1:
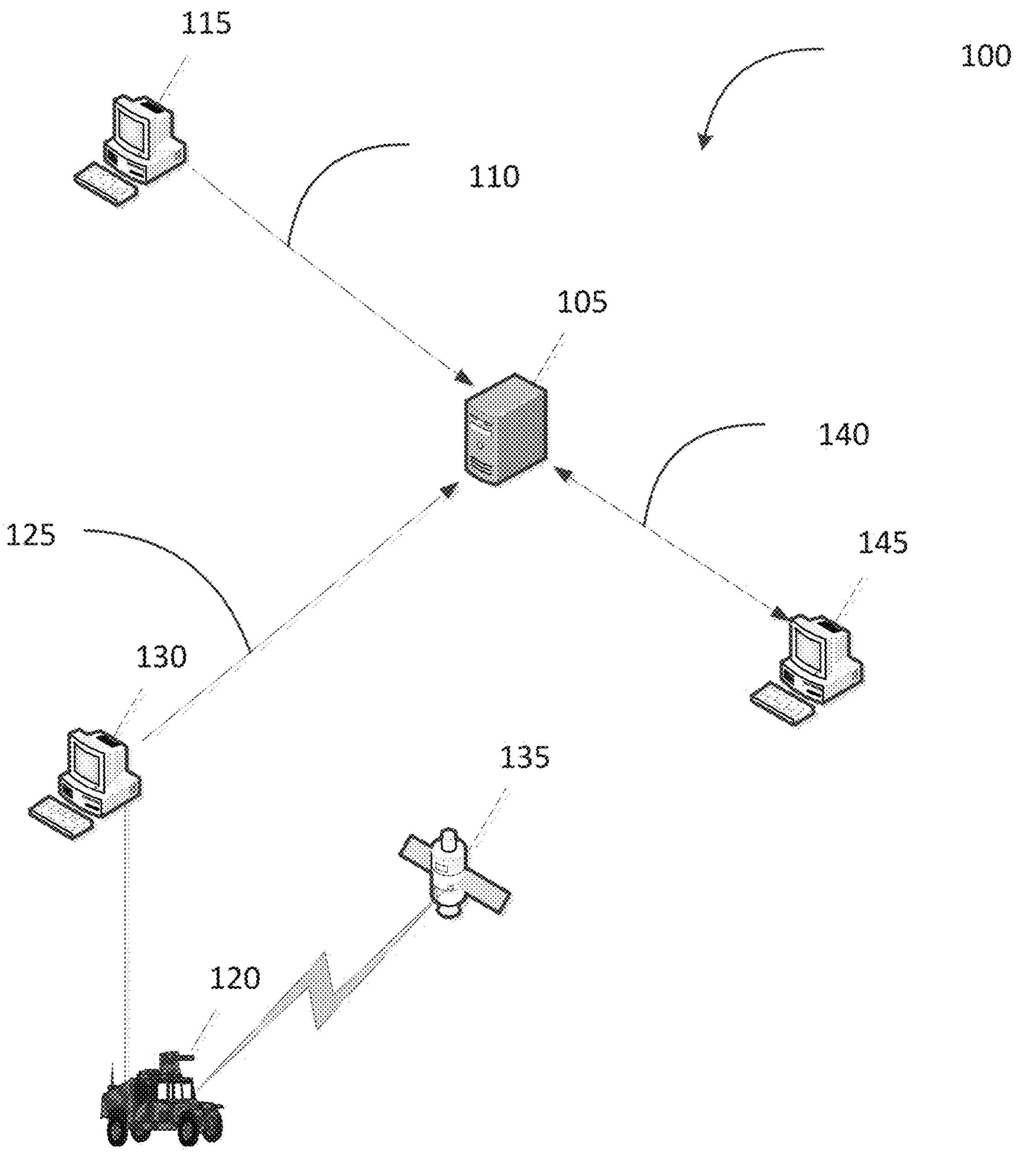
FIG. 1 is a system in accordance with some embodiments.

FIG. 1 is a system 100 in which example embodiments may be implemented. The system 100 may encompass a military theater of operation or a portion thereof. The system 100 includes an electronic warfare battle management (EWBM) system 105. While one EWBM 105 is shown in FIG. 1, the system 100 may include multiple EWBMs.

The EWBM system 105 may receive planned maneuver route information over a connection 110 from a system 115. The system 115 may be, for example, a command post of the future (CPoF) system. The connection 110 may be, for example, a Wi-Fi connection, Ethernet connection, etc.

The planned maneuver route information may include, for example, route point locations, effective start and stop times, and speed or estimated speed for a PE 120. While one PE 120 is shown, the system 100 may include multiple PEs 120. The planned maneuver route information may be in Joint Variable Message Format (JVMF). The route information may be a K05.17 Overlay Message. In particular, the route information may be a DFI/DUI 4170/003 type 9 Route Overlay.

The EWBM system 105 may receive geographic position information for a PE 120 over a connection 125 from a system 130. The system 130 may be, for example, a Blue Force Tracker system or other global positioning system (GPS)-enabled system. The system 130 may receive GPS information or other information from a GPS satellite 135. The PE 120 may be GPS-enabled. The geographic position information for the PE 120 may include last known locations, speed, or date and time (DTG) information of the PE 120. The system 130 may transmit position information for the PE 120 s in a JVMF message. For example, the EWBM 105 may receive the position information in a K05.1 Position Report Message. If the PE 120 is unable to report position information, the PE 120 location may be received from other sources, for example a Ground Moving Target Indicator (GMTI), not shown in FIG. 1.

The EWBM system 105 may receive information, for example threat information, over connections 140 with other systems 145. The threat information may include the DTG of the detections, a name or identifier of the type of threat detected, or the geographic location of the threat detected. The type of the threat detected may be characterized as having a threat effectiveness area, a receiver sensitivity, or other type characteristics. Values for the type characteristics may be included in the threat information received from the systems 145. The systems 145 may be, for example, intelligence, surveillance and reconnaissance (ISR) systems. The EWBM 105 may provide ES jamming asset task information, flight path updates, or other information, in accordance with example embodiments, to the systems 145. The receiver sensitivity values may be used for determining power levels for power-based jamming of the threat, as discussed in more detail below.

Example embodiments may provide coordination between a PE 120 and air assets (not shown in FIG. 1) to provide suppression of C2 ES to protect a PE 120 during performance of the PE 120's mission. Coordination may be complicated when multiple PEs are operating in proximity with each other. In some embodiments, therefore, the EWBM system 105 may provide allocation and deployment of ES jamming assets in multiple combinations. The EWBM system 105 may further support dynamic updates of these assignment and deployments as the situation on the ground changes.

Figure 2:
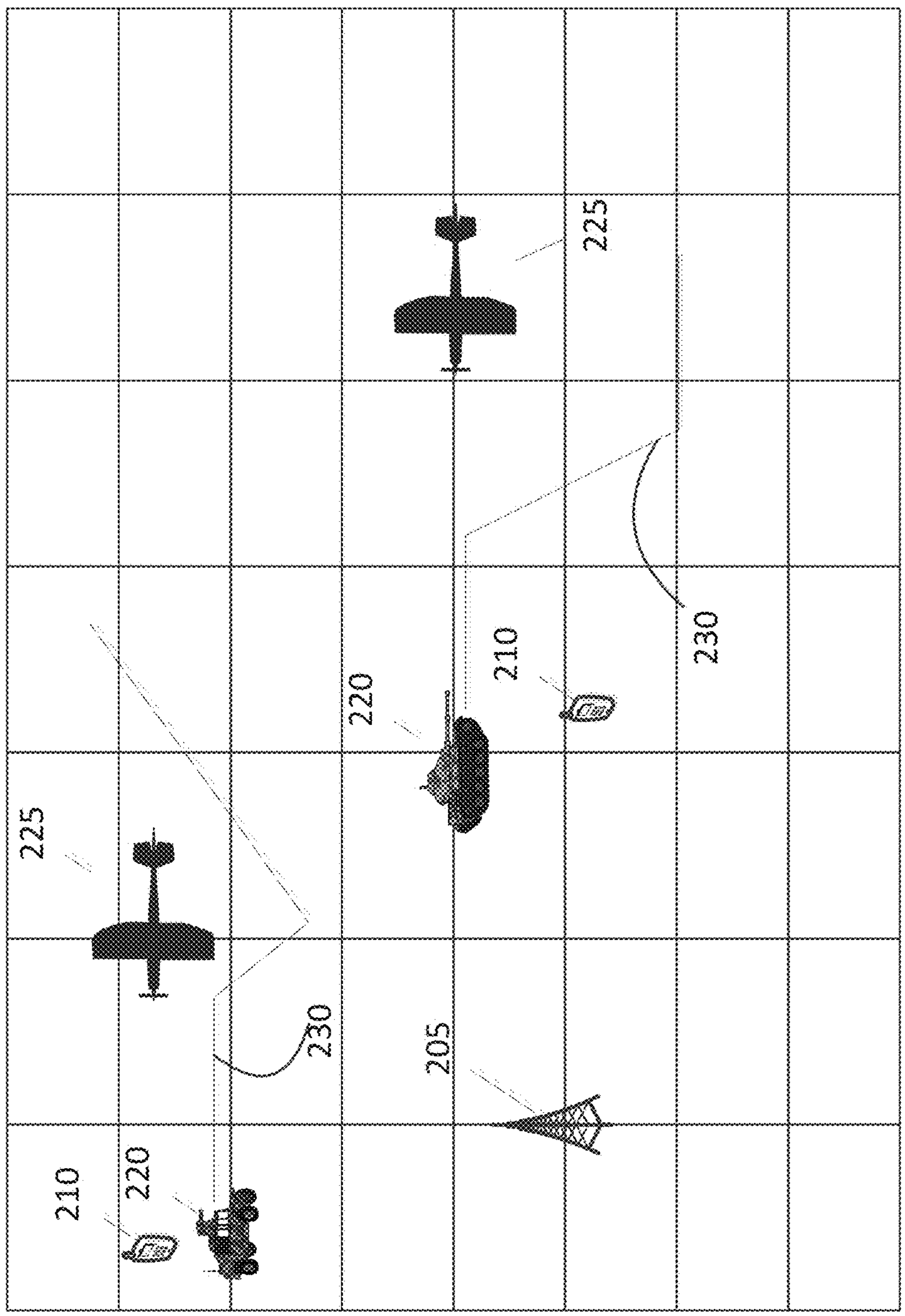
FIG. 2 is a diagram of a grid of protection in accordance with some embodiments.

FIG. 2 is a diagram of a grid of protection in accordance with some embodiments.

Referring to FIG. 2, example embodiments may divide a battlefield into a grid 200. The grid 200 may represent several domains. A first domain may include the ES threats 205, 210 that affect the battlefield. Threats may include fixed threats 205 with fixed positions and known coverage areas. Threats may also include mobile threats 210 with unknown coverage areas. Both fixed threats 205 and mobile threats 210 may have an ES lethality area that may pose a threat to a PE 220.

In example embodiments, ES jamming assets 225 may provide coverage for, and protection against, mobile threats 210 based on where the PEs 220 need protection. For example, the PE 220 may need protection over at least one portion of a planned route 230. In example embodiments, ES jamming assets 225 may provide coverage for, and protection against, against fixed threats 205 based on where the fixed threats 205 are located.

The second domain may include the Protected Entities (PE) 220, which are around forces that require Electronic Attack (EA) services to void kinetic attacks from hostile forces. The PEs 220 may have a position on the grid 200 as well as a plan for maneuver 230 for which the EWBM 105 (FIG. 1) may allocate protection.

The third domain may include ES jamming assets 225, for example unmanned aerial vehicles (UAVs), to provide EA coverage for PEs 220 over a coverage area based upon the PEs' 220 need for protection and threat coverage. ES jamming assets 225 may be deployed based on PE 220 needs and based on the capabilities of the ES jamming assets 225.

In example embodiments, the grid 200 may divide the battlefield in manageable areas that the EWBM system 105 can manage across all three domains. In example embodiments, the EWBM system 105 may determine coverage needs of a PE 220 based on PE vulnerability areas (VA) and threat lethality areas (LA), described in more detail below. The EWBM system 105 may then assign ES jamming assets 225 to provide ES protection over a coverage area including at least some portions of the VAs and LAs.

In example embodiments, the EWBM system 105 may determine a VA for a PE 220 based on the current position, maneuver plan, and past location of the PE 220. An illustrative example is shown in FIG. 3.

Figure 3:
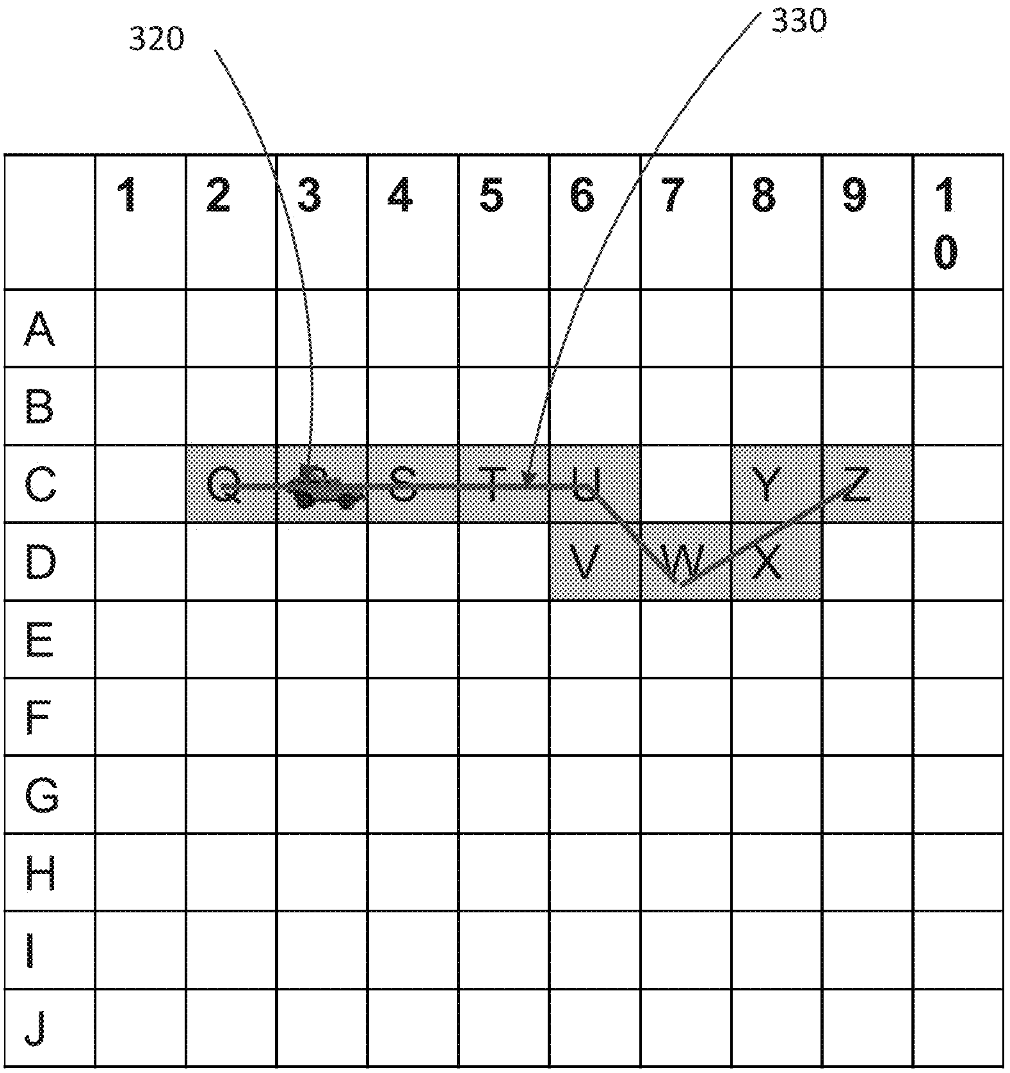
FIG. 3 is a diagram of a vulnerability area in accordance with some embodiments.

Referring to FIG. 3, a PE 320 may travel along a planned maneuver route 330 from time Q to time Z. Therefore the PE 320 may have a VA shown by the shaded squares from time Q to time Z. The PE 320 may have a current position at R (grid Row C, Column 3). While the past position Q of the PE 320 may be less important than the maneuver plan or current position R of the PE 320, some embodiments may provide coverage for a period after the PE 320 has left a location to prevent reporting of the PE 320 location by hostile threats.

The PE 320 may be more capable of providing self-coverage of the PE 320's current position R. Accordingly, in some embodiments, the EWBM system 105 (FIG. 1) may not assign ES jamming assets 225 (FIG. 2) to a PE 320 at the PE 320's current position R. The EWBM system 105 may further prioritize support for the three different types of VAs to allow the EWBM system 105 to relax coverage when fewer resources are available. For example, the EWBM system 105 may relax coverage when there are more VAs needing coverage by ES jamming assets 225 than can be protected by available ES jamming assets 225.

Referring again to FIG. 2, an ES threat 205, 210 may pose a threat to a PE 220 within a lethality area (LA, not shown in FIG. 2). An LA may be known or unknown. In example embodiments, the extent of a known LA may be determined based upon detected ES capabilities of stationary ES threats. In at least some embodiments, the EWBM system 105 may calculate the coverage area that may be covered by known LAs. The EWBM system 105 may then determine, based on overlap between the PE 220's VA and known LAs, where the PE 220 might need coverage from ES jamming assets 225.

A second LA type may include LAs presented by unknown threats. These threat areas cannot be predetermined and therefore the EWBM system 105 may assume that these threats can appear at any time. Nevertheless, unknown threats may only be significant if they are within a vicinity of a PE 220.

Figure 4:
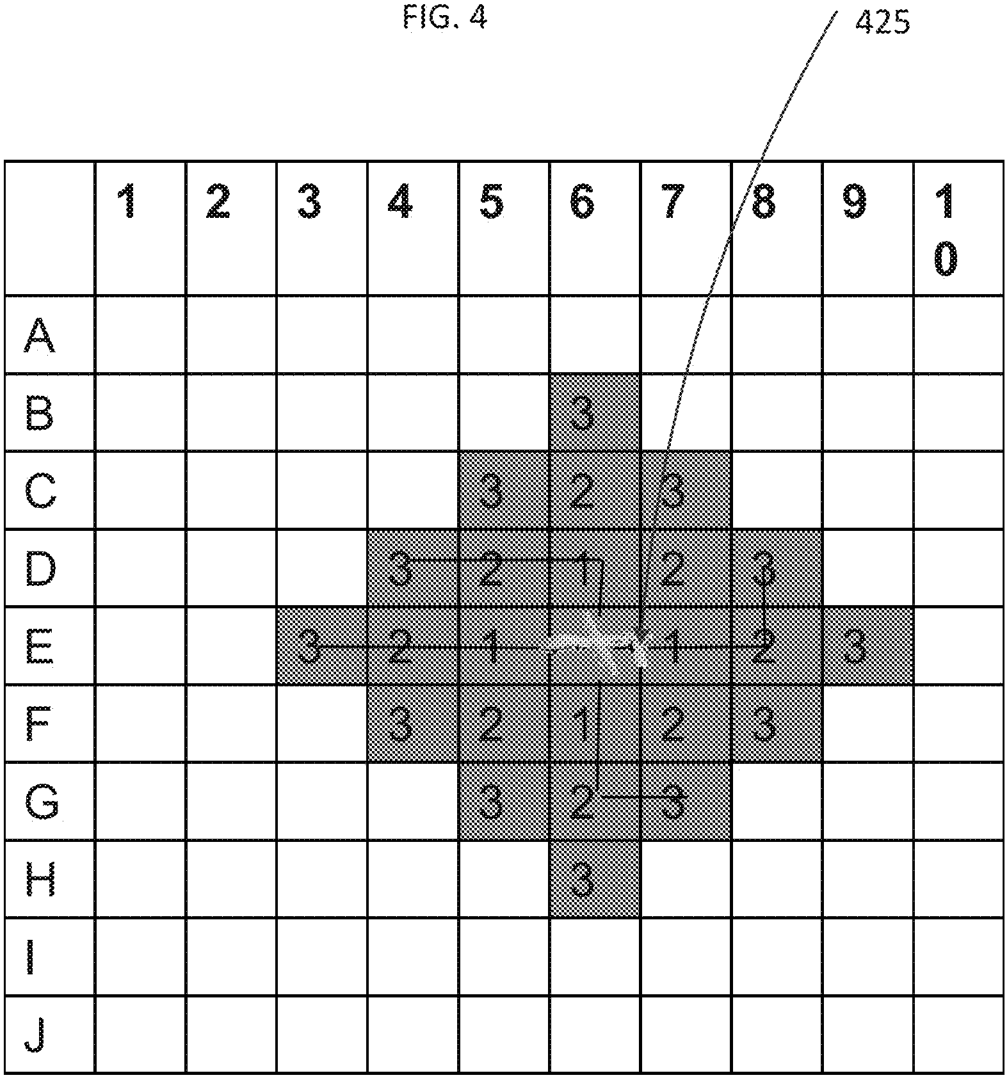
FIG. 4 is a diagram of a coverage area in accordance with some embodiments.

Protected Areas (PA) are areas of ES coverage that can be provided by an ES jamming asset 225. An illustrative example of a PA is shown in FIG. 4. In FIG. 4, an ES jamming asset 425 can cover the shaded twenty-five grid portions of the battlefield. Other example ES jamming assets 425 (not shown in FIG. 4), may cover more or fewer grid portions.

Referring again to FIG. 2, the EWBM system 105 may seek to maximize coverage of VAs using the fewest number of ES jamming assets 225 possible. The location of PAs may depend on the location of the respective ES jamming asset 225 and the type of EA coverage being provided. As the ES jamming assets 225 move around the battlefield, the coverage provided by the ES jamming assets 225 may change. The EWBM system 105 may use this information concerning coverage areas to provide maximum coverage needed by the PEs 220.

The EWBM system 105 may determine assignment information for mapping ES jamming assets 225 to VAs of PEs 220. The EWBM system 105 may use type characteristic information of detected threats, for example receiver sensitivity of detected threats, to determine power levels to be used in power-based jamming. In some embodiments in which power-based jamming is provided by ES jamming assets 225, the EWBM system 105 may determine whether a particular ES jamming asset 225 is capable of protecting a PE 220 based on the distance of the ES jamming asset 225 to a PE 220, according to the following algorithm:

Jam Range (effectiveness) to PE>Detected Threat Range to PE=PA is covered (1)

Jam Range (effectiveness) to PE<Detected Threat Range to PE=PA is not covered (2)

In another embodiment, for non-power based jamming, the EWBM system 105 may determine the jam range of an ES jamming asset 225 based on other type characteristics of the ES jamming asset 225. The other type characteristics may be received from the systems 145.

Figure 5:
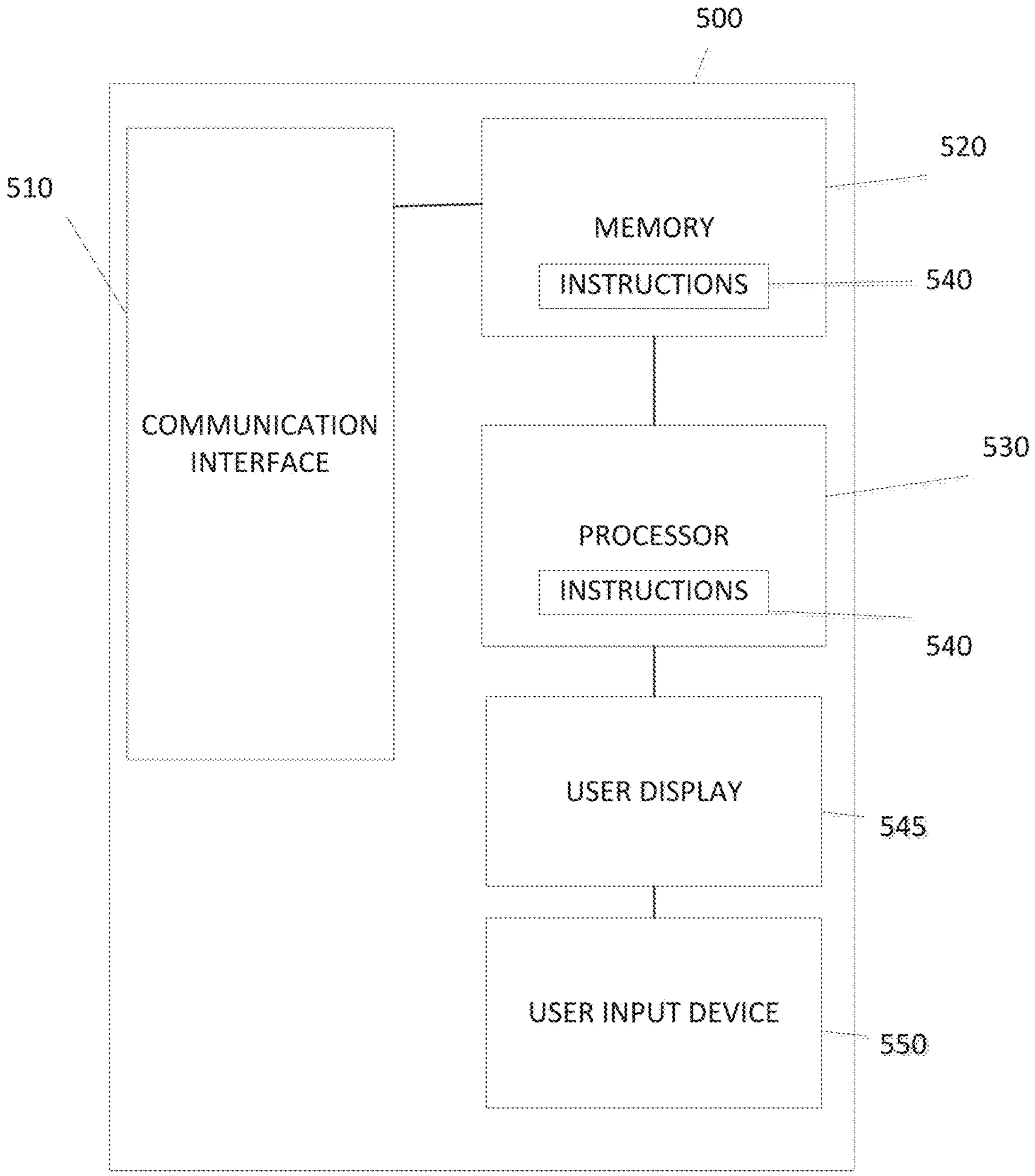
FIG. 5 is a block diagram of a system for implementing procedures in accordance with some embodiments.

FIG. 5 is a block diagram of a computer 500 for implementing methods according to example embodiments. The computer 500 may be appropriate for performing the functionalities of the EWBM system 105 (FIG. 1). The computer 500 may be appropriate for providing, for example, assignments for ES jamming assets for the protection of PEs 120 (FIG. 1).

The computer 500 may include at least one processor 530. The processor 530 may divide an electronic warfare (EW) support area into a grid. The grid may be similar to the grid described above with respect to FIG. 2.

The processor 530 may determine a vulnerability area (VA) of the entity based on planned route information of the entity within the EW support area. The VA may include portions of the grid. The VA may be similar to the VA described above with respect to FIG. 2-3. The planned route information may be received in a message in accordance with a standard of the Joint Variable Message Format (JVMF) family of standards.

The processor 530 may assign a first jamming asset to the VA based on a coverage capability of the first jamming asset. The coverage capability may include a number of contiguous portions of the grid. The coverage capability may be similar to the coverage capability described above with respect to FIGS. 2 and 4.

The computer 500 may include a communication interface 510. The communication interface 510 may receive, for example, route information of a PE 120 or 220 (FIG. 1 or 2) from a CPoF server, for example the system 115 (FIG. 1). The communication interface 510 may transmit assignment notifications to the jamming assets, for example the ES jamming assets 225 (FIG. 2).

The communication interface 510 may further be configured to receive location information of the PE 120 (FIG. 1) or 220 (FIG. 2). The communication interface 510 may further be configured to receive location information of an ES threat 205, 210 (FIG. 2) within the grid 200.

The processor 530 may update the determined VA based on the location information of the PE 120 (FIG. 1) or 220 (FIG. 2). The processor 530 may update the ES jamming asset 225 assignments based on the updated VA.

The processor 530 may assign a second ES jamming asset 225 to the VA. The second ES jamming asset 225 may be assigned to at least one portion of the VA not covered by the first ES jamming asset 225. The processor 530 may update the determined VA and the assignment of jamming assets based on the location information of the ES threat and further based on a threat range of the ES threat.

The computer 500 may further include a user display 545. The user display 545 may be configured to display entity coverage. The display of entity coverage may include the grid, an indication of the VA, and an indication of the number of portions of the VA covered by the first jamming asset.

Figure 6:
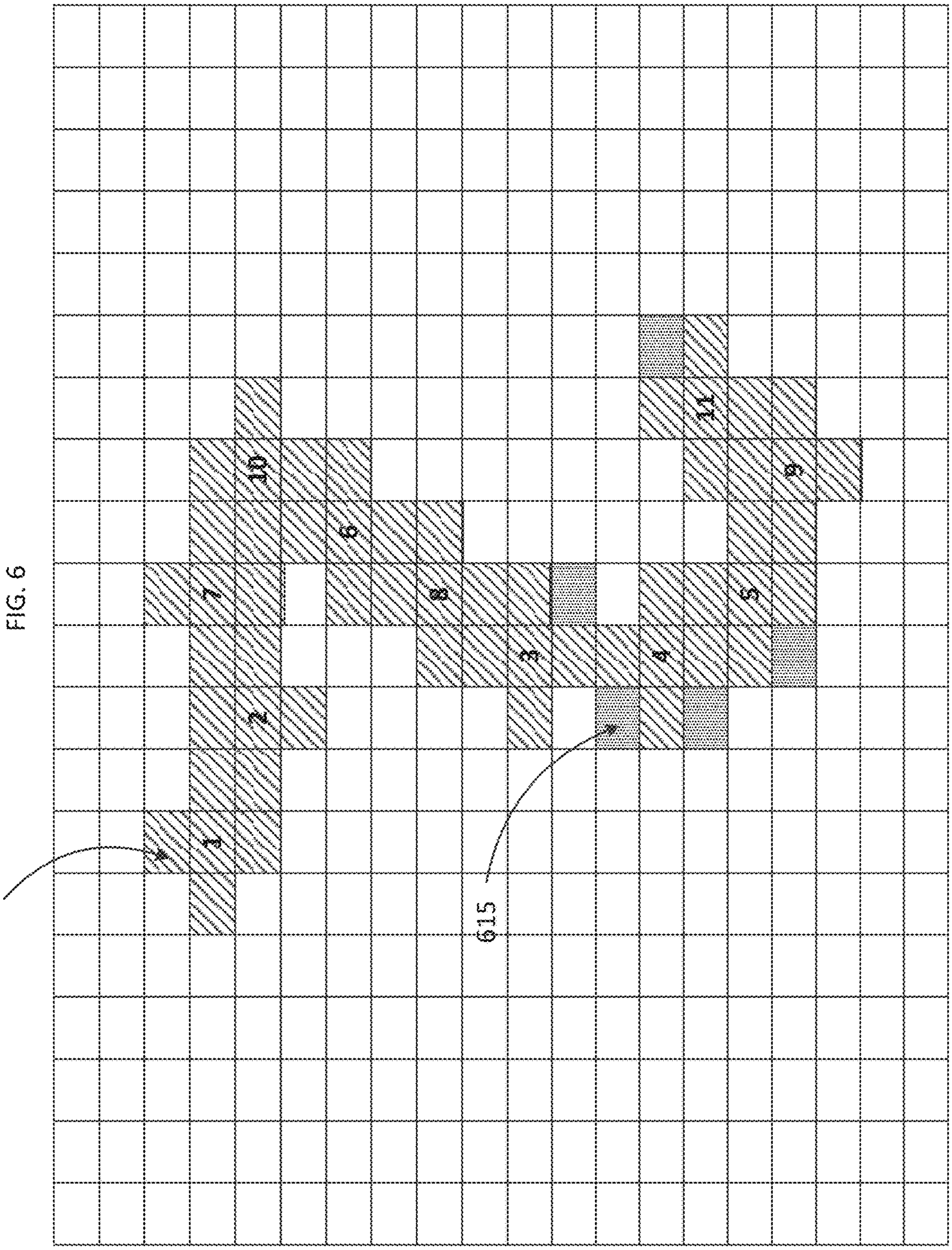
FIG. 6 is a simulation of a display in accordance with some embodiments.

A simulation of a display of entity coverage is shown in FIG. 6. In FIG. 6, eleven ES jamming assets 225, enumerated 1 through 11 in FIG. 6, each provide, in the illustrative example, a coverage area of four grid portions for coverage of VA cells 610. In other embodiments, each ES jamming asset 225 may provide, for example, coverage of thirteen grid portions, twenty-five grid portions, or any other number of grid portions. In other embodiments, some ES jamming assets 225 may provide a first coverage area, other ES jamming assets 225 may provide a second coverage area, etc.

Upon the processor 530 assigning coverage, in the illustrative example, five VA cells 615 are left uncovered. The processor 530 may modify the entity coverage based on a modification request received through a user input. The processor 530 may determine coverage to maximize the number of VA portions covered. In some embodiments, the processor 530 may determine coverage to minimize the number of ES jamming assets 225 used for coverage. The processor 530 may allow the user to pick a number of ES jamming assets 225 to use. The processor 530 may allow the user to specify preferences, for example whether the number of ES jamming assets 225 should be minimized, whether VA coverage should be maximized, etc.

Referring again to FIG. 5, the computer 500 may further include a user input device 550. The user input device may be configured to receive a user input accepting or modifying the entity coverage.

The computer 500 may include memory 520. In one embodiment, the memory 520 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

The computer 500 may include computer instructions 540 that, when implemented on the computer 500, cause the computer 500 to implement functionality in accordance with example embodiments. The instructions 540 may be stored on a computer-readable storage device, which may be read and executed by at least one processor 530 to perform the operations described herein. In some embodiments, the instructions 540 are stored on the processor 530 or the memory 520 such that the processor 530 or the memory 520 act as computer-readable media. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The instructions 540 may, when executed on the computer 500, cause the computer 500 to divide a battlefield into a grid. The grid may be similar to the grid discussed above with respect to FIG. 2. The instructions may cause the computer 500 to determine vulnerability information of an entity based on a planned route of the entity within the battlefield. The vulnerability information may include a geographic VA including portions of the grid and timing information for times that the entity is predicted to be located in corresponding portions of the grid. The vulnerability information may be similar to the vulnerability information described above with respect to FIG. 3. The instructions 540 may cause the computer 500 to identify a set of electromagnetic spectrum (ES) jamming systems within a distance of at least one portion of the VA. The instructions 540 may cause the computer 500 to transmit instructions to an ES jamming system of the set of ES jamming systems instructing the ES jamming system to provide coverage to the VA for a time period.

Figure 7:
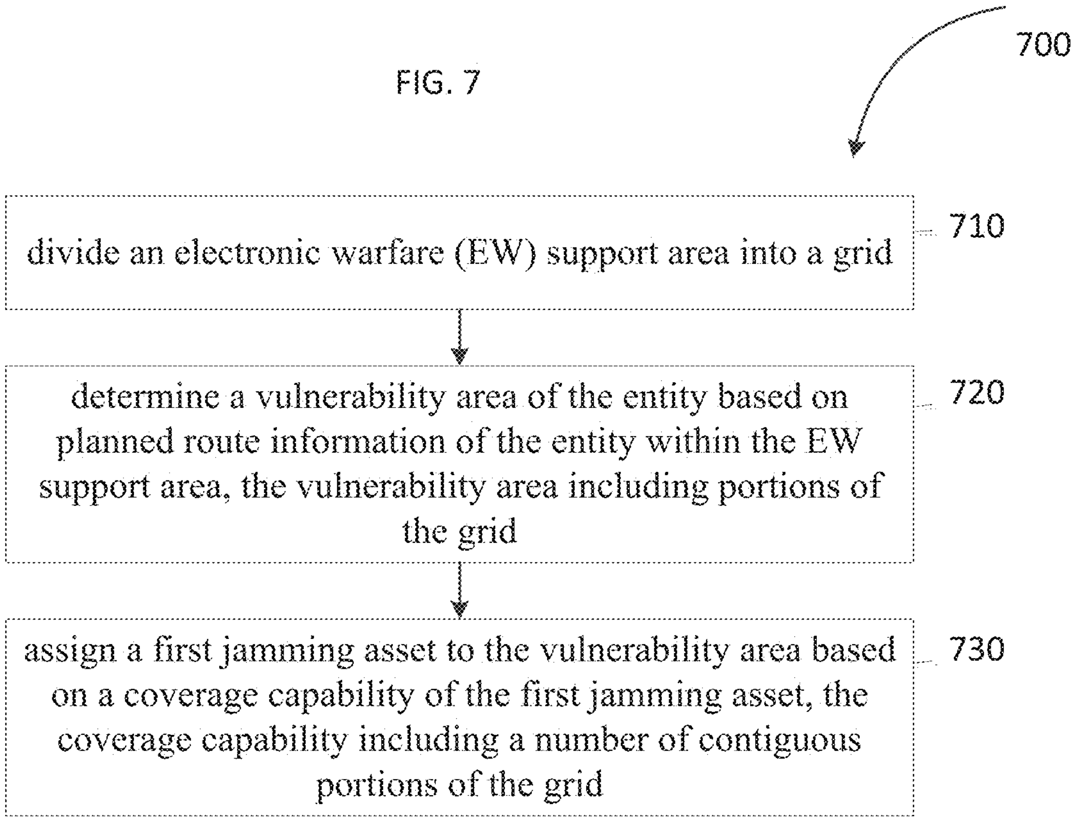
FIG. 7 is a procedure for assigning electromagnetic-spectrum (ES) jamming assets in accordance with some embodiments.

FIG. 7 illustrates a procedure 700 for assigning electromagnetic-spectrum (ES) jamming assets 225 (FIG. 2) for protection of an entity 120 (FIG. 1) or 220 (FIG. 2). The method may be performed by, for example, the processor 530 as described above.

In operation 710, the processor 530 may divide an electronic warfare (EW) support area into a grid. The grid may be similar to the grid discussed above with respect to FIG. 2.

In operation 720, the processor 530 may determine a VA of the entity based on planned route information of the entity within the EW support area. The VA may be similar to the VA discussed above with respect to FIG. 3. The VA may include portions of the grid. The planned route information may be received in a message in accordance with a standard of the Joint Variable Message Format (JVMF) family of standards.

In operation 730, the processor 530 may assign a first jamming asset to the VA based on a coverage capability of the first jamming asset. The coverage capability of the first jamming asset may be similar to the coverage capability describe above with respect to FIG. 4. The coverage capability may include a number of contiguous portions of the grid.

The processor 530 may update the determined VA based on location information of the entity. The processor 530 may update the assignment of jamming assets based on the updated VA. The processor 530 may update the determined VA and update the assignment of ES jamming assets 225 responsive to receiving location information of an ES threat within the EW support area. For example, as described above with respect to FIG. 1, the processor 530 may receive threat information from a system 145 (FIG. 1) regarding threats 205, 210 (FIG. 2). The threat information may include the DTG of the detections, the type of threat detected, or the geographic location of the threat detected. The updating may be based on a threat range of the ES threat 205, 210. The threat range may be determined based on the type information of the ES threat 205, 210. The type information may include receiver sensitivity for a receiver corresponding to the threat.

The processor 530 may implement an algorithm that uses a state machine to reduce the number of ES jamming assets 225 used without decreasing VA coverage. In an initial state of the state machine, the processor 530 may remove an ES jamming asset 225 from the list of ES jamming assets 225 that are to provide coverage. The processor 530 may perform a local search to find a covering at or below the current exposure, at which point the processor 530 may enter a second state of the state machine. In the second state, the processor 530 may adjust the current ES jamming asset 225 configuration to find a simulated placement of ES jamming assets 225 that creates the least VA exposure. For example, the processor 530 may simulate incremental movements of coverage areas of ES jamming assets 225 until the smallest VA exposure is attained. When the maximum number of search steps is reached the machine transitions to the final state. In the final state, the processor 530 may remove another ES jamming asset 225 at random and the machine may return to the initial state. The processor 530 may generate ES jamming asset 225 assignments based on results of the algorithm.

The processor 530 may generate assignment decisions for covering portions of the grid 200 based on preferences for protecting the PE 120 (FIG. 1) or 220 (FIG. 2). Preferences may be set for positions of the PE 120 or 220 based on a previous geographic position of the PE 120 or 220, a current geographic position of the PE 120 or 220, or a future geographic position of the PE 120 or 220 as discussed above with respect to FIG. 3.

Figure 8:
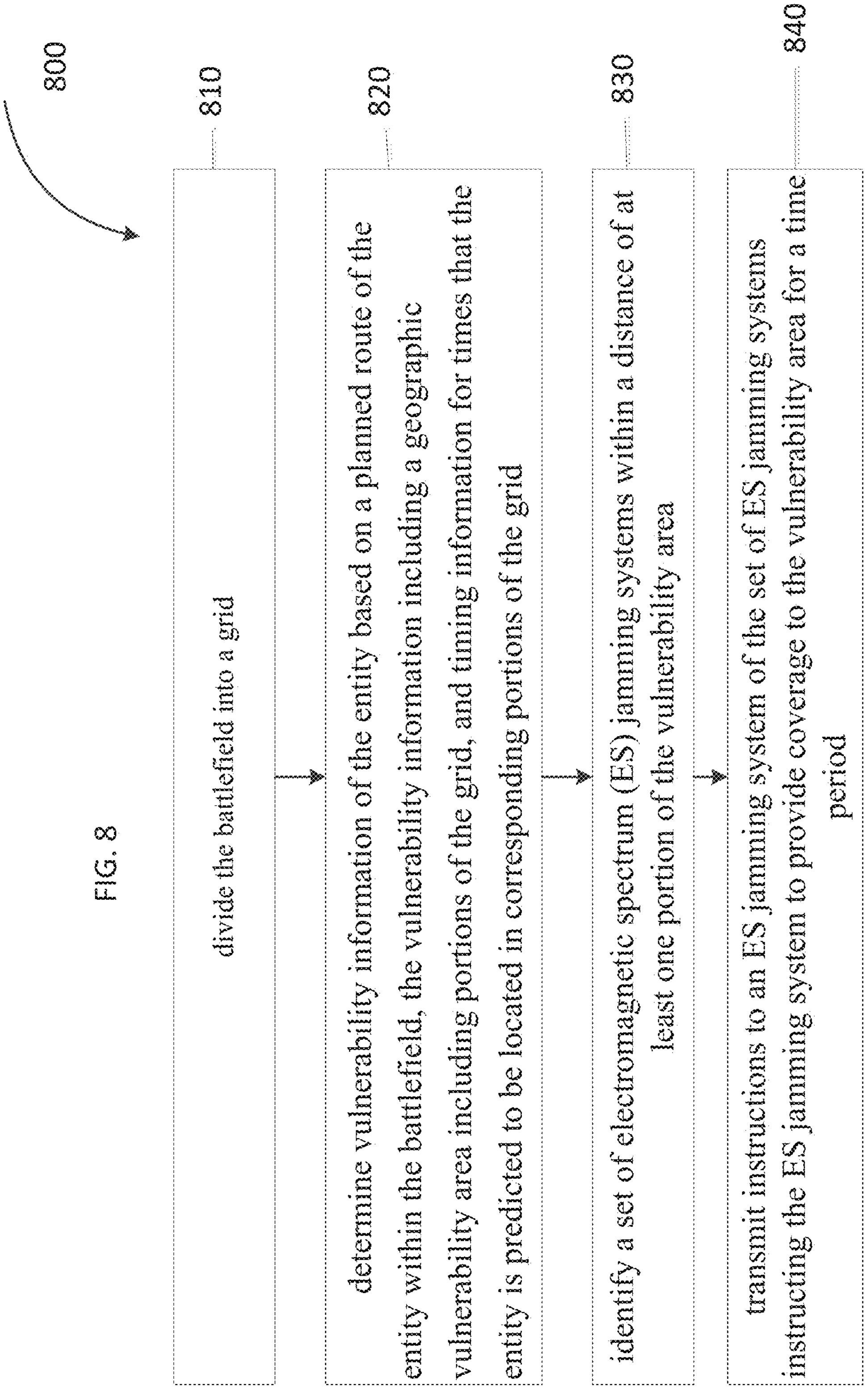
FIG. 8 is a procedure for displaying clusters of geographically-referenced data, in accordance with some embodiments.

FIG. 8 is a flow chart of a method 800 for protecting an entity on a battlefield. The method may be performed by, for example the processor 530 as described above. The entity may be a PE 120 (FIG. 1) or a PE 220 (FIG. 2).

In operation 810, the processor 530 may divide the battlefield into a grid. The grid may be similar to the grid discussed above with respect to FIG. 2.

In operation 820, the processor 530 may determine vulnerability information of the entity based on a planned route of the entity within the battlefield. The vulnerability information may include a geographic VA including portions of the grid, and timing information for times that the entity is predicted to be located in corresponding portions of the grid. The vulnerability information may include grid portions of the route of the entity as discussed above with respect to FIG. 3.

In operation 830, the processor 530 may identify a set of electromagnetic spectrum (ES) jamming assets 225 (FIG. 2) within a distance of at least one portion of the VA. The processor 530 may identify the set of ES jamming assets 225 by determining maneuver distances for each of the plurality of ES jamming systems 225 to travel between a current location of each of a plurality of ES jamming systems 225 and the VA. The processor 530 may allocate one or more of the plurality of ES jamming assets 225 to the set of ES jamming systems based on the determined maneuver distances.

In operation 840, the processor 530 may transmit instructions to an ES jamming asset 225 of the set of ES jamming assets instructing the ES jamming asset 225 to provide coverage to the VA for a time period. The processor 530 may determine an amount of time needed for the ES jamming asset 225 to travel a respective maneuver distance to a portion of the grid from which coverage is to be provided. The processor 530 may transmit maneuver instructions, based on the determined amount of time, to the ES jamming asset 225 instructing the ES jamming asset 225 to travel to the portion of the grid.

The method 800 may further include receiving, by the processor, updated location information of the entity. The processor 530 may provide jamming signals in a portion of the VA based on the updated location information of the entity. The processor 530 may provide jamming signals in a first portion for a time duration subsequent to receiving a notification that the entity has left the first portion. For example, the processor 530 may provide these jamming signals after the entity has left the first portion in order to prevent a hostile force from reporting on the entity's previous location, direction of travel, etc. The processor 530 may suppress jamming signals in a first portion responsive to receiving a notification that the entity is within the first portion. For example, the processor 530 may suppress jamming signals in a first portion upon receiving notification that the entity is within the first portion at least because the entity may self-protect in the first portion.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for assigning electromagnetic-spectrum (ES) jamming assets for protection of an entity, the method comprising:

performing by a processor in a computing device:

dividing an electronic warfare (EW) support area into a grid;

receiving planned route information for the entity within the EW support area, the planned route information including a past position, a current position and estimated future positions of the entity along the planned route;

determining a vulnerability area (VA) of the entity based on the planned route information, the VA including portions of the grid and indicating:

the past position, the current position and the estimated future positions of the entity; and timing information for times that the entity was at the past position and is predicted to be located at the estimated future positions in corresponding portions of the grid;

determining a lethality area (LA) associated with the entity based on ES capabilities of one or more ES threats to the entity in proximity to the planned route; and assigning a first jamming asset to the VA based on:

a coverage capability of the first jamming asset, the coverage capability including a number of contiguous portions of the grid; and an overlap between the vulnerability area and the lethality area.

2. The method of claim 1, further comprising:

updating the determined VA based on location information of the entity; and updating the assignment of jamming assets based on the updated VA.

3. The method of claim 2, further comprising:

updating the determined VA and updating the assignment of jamming assets responsive to receiving location information and type information of the one or more ES threats within the EW support area.

4. The method of claim 3, wherein the updating is based on a threat range of the one or more ES threats.

5. The method of claim 4, wherein the threat range is determined based on the type information of the one or more ES threats.

6. The method of claim 5, wherein:

each of the one or more ES threats includes a device with a transmitter and a receiver of electromagnetic-spectrum signals; and the type information includes receiver sensitivity for the receiver of the device associated with each of the one or more ES threats.

7. The method of claim 1, further comprising:

assigning a second jamming asset to the VA, the second jamming asset assigned to at least one portion of the VA not covered by the first jamming asset.

8. The method of claim 1, further comprising:

generating a display of entity coverage, the display including the grid, an indication of the VA, and an indication of the number of portions of the VA covered by the first jamming asset; and modifying the entity coverage based on a modification request received through a user input.

9. The method of claim 1, wherein the assigning further comprises:

generating assignment decisions for covering portions of the grid based on preferences for protecting the entity in one or more of:

a previous geographic position of the entity;

a current geographic position of the entity; and a future geographic position of the entity.

10. The method of claim 1, wherein the planned route information is received in a message in accordance with a standard of the Joint Variable Message Format (JVMF) family of standards.

11. A od for protecting an entity on a battlefield, the method comprising:

performing by a processor in a computing device:

dividing the battlefield into a grid;

determining vulnerability information of the entity based on a planned route of the entity within the battlefield, the vulnerability information including:

a geographic vulnerability area (VA) including portions of the grid, the VA indicating a plurality of past positions, a current position and a plurality of estimated future positions of the entity along the planned route; and timing information for times that the entity was at the past positions and is predicted to be located in corresponding portions of the grid associated with the estimated future positions;

determining a lethality area (LA) associated with the entity based on electromagnetic spectrum (ES)capabilities of one or more ES threats to the entity in proximity to the planned route;

identifying a set of electromagnetic spectrum (ES) jamming systems within a distance of a east one portion of the VA and the LA; and transmitting instructions to an ES jamming system of the set of ES jamming systems instructing the ES jamming system to provide coverage to the VA and the LA for a time period.

12. The meth of claim 11, wherein identifying the set comprises:

determining maneuver distances between a current location of each of a plurality of ES jamming systems and the VA; and allocating one or more of the plurality of ES jamming systems to the set of ES jamming systems based on the determined maneuver distances.

13. The method of claim 12, wherein transmitting instructions further comprises:

determining an amount of time needed for the ES jamming system to travel a respective maneuver distance to a portion of the grid from which coverage is to be provided; and transmitting maneuver instructions, based on the determined amount of time, to the ES jamming system instructing the ES jamming system to travel to the portion of the grid.

14. The method of claim 11, further comprising:

receiving updated location information of the entity; and providing jamming signals in a portion of the VA based on the updated location information of the entity.

15. The method of claim 14, further comprising:

providing jamming signals in a first portion for a time duration subsequent to receiving a notification that the entity has left the first portion.

16. The method of claim 14, further comprising:

suppressing jamming signals in a first portion responsive to receiving a notification that the entity is within the first portion.

17. An apparatus for assigning electromagnetic-spectrum (ES) jamming assets for protection of an entity, the apparatus comprising:

one or more processors configured to:

divide an electronic warfare (EW) support area into a grid;

receive planned route information for the entity within the EW support area, the planned route information including a past position, a current position and an estimated future position of the entity along the planned route;

determine a vulnerability area (VA) of the entity based on the planned route information of the entity within the EW support area, the VA including portions of the grid and indicating:

the past position, the current position and the estimated future position of the entity along the planned route; and timing information for times that the entity is predicted to be located at the estimated future position in the grid;

determining a lethality area (LA) associated with the entity based on ES capabilities of one or more ES threats to the entity in proximity to the planned route;

assign a first jamming asset to the VA based on a coverage capability of the first jamming asset and an overlap between the LA and the VA, the coverage capability including a number of contiguous portions of the grid; and a communication interface configured to receive route information from a command server and transmit assignment notifications to the jamming assets.

18. The apparatus of claim 17, wherein the communication interface is further configured to receive location information of the entity; and the one or more processors are further configured to:

update the determined VA based on the location information;

update the assignments based on the updated VA; and assign a second jamming asset to the VA, the second jamming asset assigned to at least one portion of the VA not covered by the first jamming asset.

19. The apparatus of claim 18, wherein the communication interface is further configured to receive location information and type information of one of the one or more ES threats within the geographic area, the ES threat including a device with a transmitter and a receiver of electromagnetic-spectrum signals; and the one or more processors are further configured to:

determine a threat range of the ES threat based on the type information of the ES threat, the type information including a receiver sensitivity for the receiver of the device corresponding to the ES threat; and update the determined VA and the assignment of jamming assets based on the location information and the threat range of the ES threat.

20. The apparatus of claim 17, further comprising:

a user display configured to display entity coverage, the display of entity coverage including the grid, an indication of the VA, and an indication of the nurriber of portions of the VA covered by the first jamming asset; and a user input device configured to receive a user input accepting or modifying the entity coverage.

21. The apparatus of claim 17, wherein the planned route information is received in a message in accordance with a standard of the Joint Variable Message Format (JVMF) family of standards.

22. A non-transitory computer-readable medium storing instructions that, when executed on an Electronic Warfare Battle Management (EWBM) device, cause the EWBM device to:

divide a battlefield into a grid;

receive planned route information for the entity within the EW support area, the planned route information including at least one past position, a current position and an estimated future position of the entity along the planned route;

determine vulnerability information of an entity based on the planned route of the entity within the battlefield, the vulnerability information including a geographic vulnerability area (VA) including portions of the grid and indicating:

the at least one past position, the current position and the estimated future position of the entity along the planned route; and timing information for times that the entity was at the at least one past position and is predicted to be located in corresponding portions of the grid associated with the estimated future position;

determining a lethality area (LA) associated with the entity based on electromagnetic spectrum (ES)capabilities of one or more ES threats to the entity in proximity to the planned route;

identify a set of ES jamming systems within a distance of at least one portion of the VA based at least on an overlap between the VA and the LA; and transmit instructions to an ES jamming system of the set of ES jamming systems instructing the ES jamming system to provide coverage to the VA for a time period.

23. The non-transitory computer-readable medium of claim 21, further comprising instructions that, when implemented on the EWBM device, cause the EWBM device to:

determine maneuver distances between a current location of each of a plurality of ES jamming systems and the VA; and allocate one or more of the plurality of ES jamming systems to the set of ES jamming systems based on the determined maneuver distances.

24. The non-transitory computer-readable medium of claim 23, further comprising instructions that, when implemented on the EWBM device, cause the EWBM device to:

determine an amount of time needed for an allocated ES jamming system to travel a respective maneuver distance to a portion of the grid from which coverage is to be provided; and transmit maneuver instructions, based on the determined amount of time, to the allocated ES jamming system instructing the allocated ES jamming system to travel to the portion of the grid.

25. The non-transitory computer-readable medium of claim 21 further comprising instructions that, when implemented on the EWBM device, cause the EWBM device to:

receive updated location information from the entity;

provide jamming signals in a portion of the VA based on the updated location information of the entity.

26. The non-transitory computer-readable medium of claim 24 further comprising instructions that, when implemented on the EWBM device, cause the EWBM device to:

provide jamming signals in a first portion for a time duration subsequent to receiving a notification that the entity has left the first portion; and suppress jamming signals in the first portion responsive to receiving a notification that the entity is within the first portion.

* * * * *